United States Patent
Kim et al.

(10) Patent No.: US 11,823,613 B2
(45) Date of Patent: Nov. 21, 2023

(54) DISPLAY DEVICE AND DIRECT CURRENT VOLTAGE SUPPLY METHOD

(71) Applicant: LG ELECTRONICS INC., Seoul (KR)

(72) Inventors: Dohoon Kim, Seoul (KR); Jinhaeng Jang, Seoul (KR); Seunghun Jang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/757,447

(22) PCT Filed: Dec. 19, 2019

(86) PCT No.: PCT/KR2019/018114
§ 371 (c)(1),
(2) Date: Jun. 15, 2022

(87) PCT Pub. No.: WO2021/125394
PCT Pub. Date: Jun. 24, 2021

(65) Prior Publication Data
US 2023/0005414 A1 Jan. 5, 2023

(51) Int. Cl.
*G09G 3/3233* (2016.01)
*H02M 3/335* (2006.01)
*G09G 3/3208* (2016.01)
*G09G 3/20* (2006.01)

(52) U.S. Cl.
CPC ......... *G09G 3/2096* (2013.01); *G09G 3/3233* (2013.01); *G09G 2300/0842* (2013.01); *G09G 2320/0204* (2013.01); *G09G 2320/043* (2013.01); *G09G 2320/0626* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 9,136,754 B2* | 9/2015 | Ahn | H02M 3/07 |
| 2006/0192774 A1 | 8/2006 | Yasumura | |
| 2007/0024202 A1* | 2/2007 | Lee | G09G 3/296 |
| | | | 315/160 |
| 2009/0322251 A1* | 12/2009 | Hilgers | H05B 47/185 |
| | | | 315/307 |

(Continued)

FOREIGN PATENT DOCUMENTS

| KR | 100844475 | 7/2008 |
|---|---|---|
| KR | 1020090059775 | 6/2009 |

(Continued)

OTHER PUBLICATIONS

PCT International Application No. PCT/KR2019/018114, International Search Report dated Aug. 28, 2020, 2 pages.

(Continued)

*Primary Examiner* — Sepehr Azari
(74) *Attorney, Agent, or Firm* — LEE, HONG, DEGERMAN, KANG & WAIMEY PC

(57) ABSTRACT

A display device comprises: a display module including a display panel; a control board for controlling the display module; and a power board for outputting direct current voltage to the display module. The power board changes the pulse frequency of a control signal so as to output direct current voltage adjusted according to changes in the load of the display panel.

18 Claims, 7 Drawing Sheets

(56) References Cited

U.S. PATENT DOCUMENTS

| | | | |
|---|---|---|---|
| 2010/0020578 A1 | 1/2010 | Ryu et al. | |
| 2011/0292029 A1* | 12/2011 | Park | G09G 3/344 |
| | | | 345/107 |
| 2012/0025720 A1 | 2/2012 | Chen et al. | |
| 2012/0069603 A1 | 3/2012 | Ryu et al. | |
| 2012/0105031 A1* | 5/2012 | Kumagai | H02M 3/156 |
| | | | 323/271 |
| 2013/0169695 A1 | 7/2013 | Hyeon et al. | |
| 2015/0116300 A1 | 4/2015 | Yamaki et al. | |
| 2015/0170601 A1* | 6/2015 | Lee | H02M 3/156 |
| | | | 345/94 |
| 2016/0057822 A1 | 2/2016 | Chu | |
| 2018/0122293 A1* | 5/2018 | Lim | G09G 3/2092 |
| 2019/0213971 A1* | 7/2019 | Kim | G09G 3/3611 |
| 2020/0144916 A1* | 5/2020 | Lee | H02M 1/36 |
| 2020/0152121 A1* | 5/2020 | Sung | H02M 3/158 |
| 2020/0273428 A1* | 8/2020 | Kim | G09G 5/10 |

FOREIGN PATENT DOCUMENTS

| | | |
|---|---|---|
| KR | 1020100011471 | 2/2010 |
| KR | 1020130076413 | 7/2013 |

OTHER PUBLICATIONS

European Patent Office Application Serial No. 19956262.0, Search Report dated May 9, 2023, 9 pages.
Korean Intellectual Property Office Application No. 10-2022-7015677, Office Action dated Jul. 17, 2023, 6 pages.

\* cited by examiner

DISPLAY DEVICE AND DIRECT CURRENT VOLTAGE SUPPLY METHOD

CROSS-REFERENCE TO RELATED APPLICATION(S)

This application is the National Stage filing under 35 U.S.C. 371 of International Application No. PCT/KR2019/018114, filed on Dec. 19, 2019, the contents of which are all incorporated by reference herein in its entirety.

TECHNICAL FIELD

Embodiments relate to a display apparatus and a direct current (DC) voltage supply method.

BACKGROUND ART

Recently, the types of display device have been diversified. Among them, an organic light emitting diode display (hereinafter referred to as an OLED display device) is widely used.

Since the OLED display device is a self-luminous device, it consume less power and may be manufactured thinner than a liquid crystal display device requiring a backlight. In addition, the OLED display device has a wide viewing angle and a rapid response speed.

In a conventional OLED display device, a constant voltage is maintained regardless of a change in load of the OLED display device.

In this case, even when the load is small, as a constant voltage is supplied to the OLED display device, stress is applied to related elements of the OLED display device, thereby reducing the lifespan of the OLED display device.

In addition, in order to maintain the constant voltage, since the constant voltage is not reduced even when the load is low, power efficiency is lowered and energy waste is caused.

INVENTION

Technical Problem

An object of embodiments is to provide a display device and a DC voltage supply method capable of increasing lifespan.

Another object of embodiments is to provide a display device and a DC voltage supply method capable of maximizing power efficiency.

Technical Solution

A display device according to an embodiment comprises a display module including a display panel, a control board configured to control the display module, and a power board configured to output a DC voltage to the display module. The power board changes a pulse frequency of a control signal in order to output an adjusted DC voltage according to a change in load of the display panel.

A DC voltage supply method of a display device according to an embodiment comprises detecting a change in load of a display panel in a display module, changing a pulse frequency of a control signal according to the detected change in load, adjusting a DC voltage based on the changed pulse frequency, and outputting the adjusted DC voltage to the display module.

Effect of the Invention

According to an aspect of the embodiment, a DC voltage is lower than a set DC voltage in a section in which current is low according to a change in a load, thereby decreasing stress applied to related elements to extend lifespan and improving power efficiency to reduce energy waste.

Further scope of applicability of the embodiments will become apparent from the following detailed description. However, it should be understood that the detailed description and specific embodiments, such as preferred embodiments, are given by way of example only, since various changes and modifications within the spirit and scope of the embodiments may be clearly understood by those skilled in the art.

BEST MODE

Hereinafter, preferred embodiments of the present invention will be described in detail with reference to the accompanying drawings. However, the technical spirit of the present invention is not limited to some embodiments described herein, but may be implemented in various different forms, and, within the scope of the technical spirit of the present invention, one or more of the components of the embodiments may be selectively combined and substituted for use. In addition, terms (including technical and scientific terms) used in the embodiments of the present invention may be interpreted to have a meaning that can be generally understood by those of ordinary skill in the art to which the present invention belongs, unless specifically defined and described explicitly, and the meanings of commonly used terms such as terms defined in advance may be interpreted in consideration of the contextual meaning of the related art. In addition, the terms used in the embodiments of the present invention are for describing the embodiments and are not intended to limit the present invention. In this specification, the singular form may also include the plural form unless otherwise specified in the phrase, and when it is described as "at least one (or more than one) of B and C", it may include one or more of all combinations of A, B and C. It will be understood that, although the terms first, second, A, B, (a), (b), etc. may be used herein to describe various elements of the present invention, these terms are only used to distinguish one element from another element and essential, order, or sequence of corresponding elements are not limited by these terms. In addition, when it is described that a component is 'connected to', 'coupled to' or 'access' another component, a component may be directly connected to, coupled to or access another component or a component may be connected to, coupled to or access another component via another component therebetween.

Figure 1:
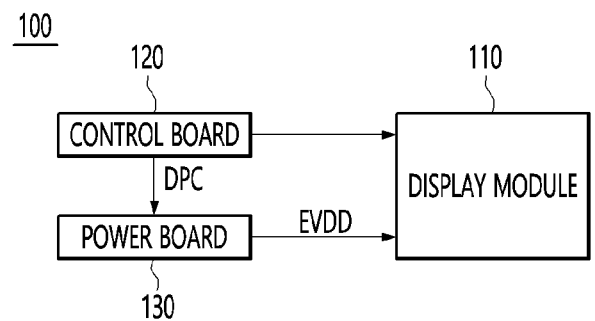
FIG. 1 is a block diagram illustrating a display device according to an embodiment.

FIG. 1 is a block diagram illustrating a display device according to an embodiment.

Referring to FIG. 1, a display device 100 according to an embodiment may include a control board 120, a power board 130 and a display module 110.

The control board 120 may be referred to as a control unit, a controller, a processor, a CPU, etc. The power board 130 may be referred to as a power unit, a power supply unit, a power management unit, a power controller, etc. The display module 110 may be referred to as a display, a display unit, a display block, a display section, an image display device, an image device, etc.

The control board 120 is responsible for overall management and control of the display device 100. For example, the control board 120 may control the display device 100 to display an image. For example, the control board 120 may control the power board 130 to stably a DC voltage (EVDD) to the display device 100. For example, the control board 120 may obtain state information of the display device 100 based on various types of detected signal received from the display device 100, and control the display device 100 to take an action corresponding to the state information. In addition, the control device may perform management and control to implement various functions.

In an embodiment, the control board 120 may obtain load state information of the display module 110, specifically, a display panel (118 of FIG. 2), and output an output signal DPC, for example, a signal level (value), according to the load state information. The output signal DPC is continuously variable. The load state is energy consumed in the display panel 118 and may be determined by driving current used to display an image on the display panel 118. For example, the load may be large when the display panel 118 requires a large amount of driving current, and may be small when the display panel 118 requires a small amount of driving current.

For example, when most of a plurality of pixels of the display panel 118 display a white grayscale image, since maximum driving current per pixel is required to display the white grayscale image, a sum of driving current necessary for most pixels of the display panel 118 is large, which may mean that the load is large. In contrast, when most of the plurality of pixels of the display panel 118 display a black grayscale image, since minimum driving current per pixel, for example, 0 mA or a current value close thereto, is required to display the black grayscale image, a sum of driving current necessary for most pixels of the display panel 118 is small, which may mean that the load is small.

Although the load is large when the white grayscale image is displayed and the load is small when the black grayscale image is displayed in the above description, the opposite is also possible.

Figure 7:
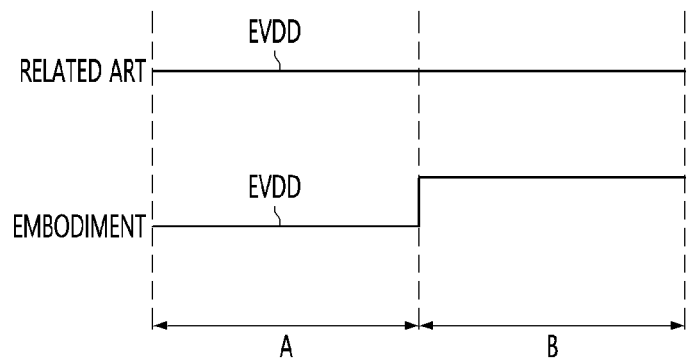
FIG. 7 is a view illustrating a DC voltage according to a change in load in the related art and embodiments.

As shown in FIG. 7, in the related art, a DC voltage EVDD is constantly maintained as a constant voltage regardless of the load.

In contrast, in an embodiment, the power board 130 may adjust the DC voltage EVDD to be optimized to the load state of the display panel 11 based on the output signal DPC of the control board 120. For example, the power board 130 may adjust the DC voltage EVDD to decrease in a section A in which the load is small, and adjust the DC voltage EVDD to increase in a section B in which the load is large. For example, the sections A and B may be 5 to 30 frame sections, but the embodiments are not limited thereto.

Accordingly, in the embodiment, by adjusting the DC voltage EVDD to be optimized according to a change in load, power efficiency may be improved and lifespan may be extended.

Although the load state is divided into the sections A and B for convenience of description in FIG. 7, the DC voltage EVDD may be adjusted in real time according to the load state based on a frame unit.

The control board 120 and the power board 130 will be described in detail later and the display module 110 will first be described in detail with reference to FIGS. 2 to 4.

Figure 2:
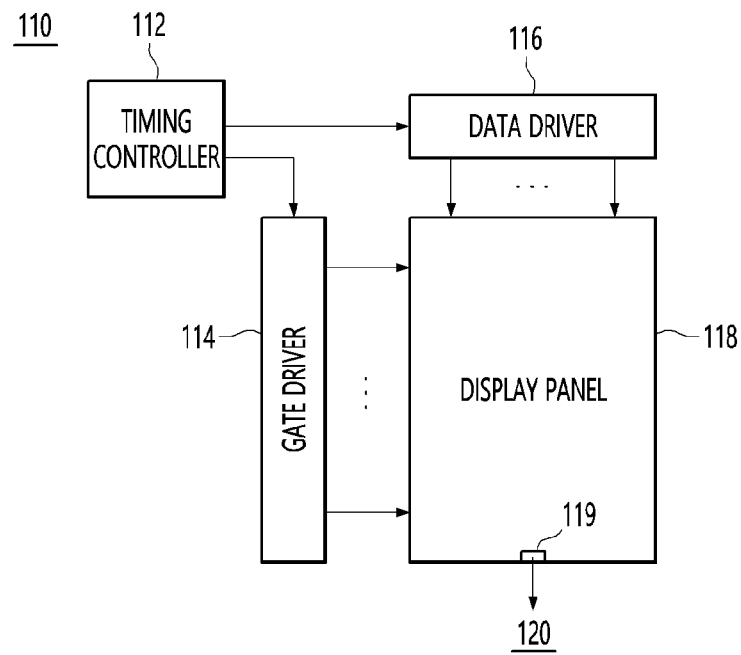
FIG. 2 is a block diagram illustrating a display module of FIG. 1.
Figure 3:
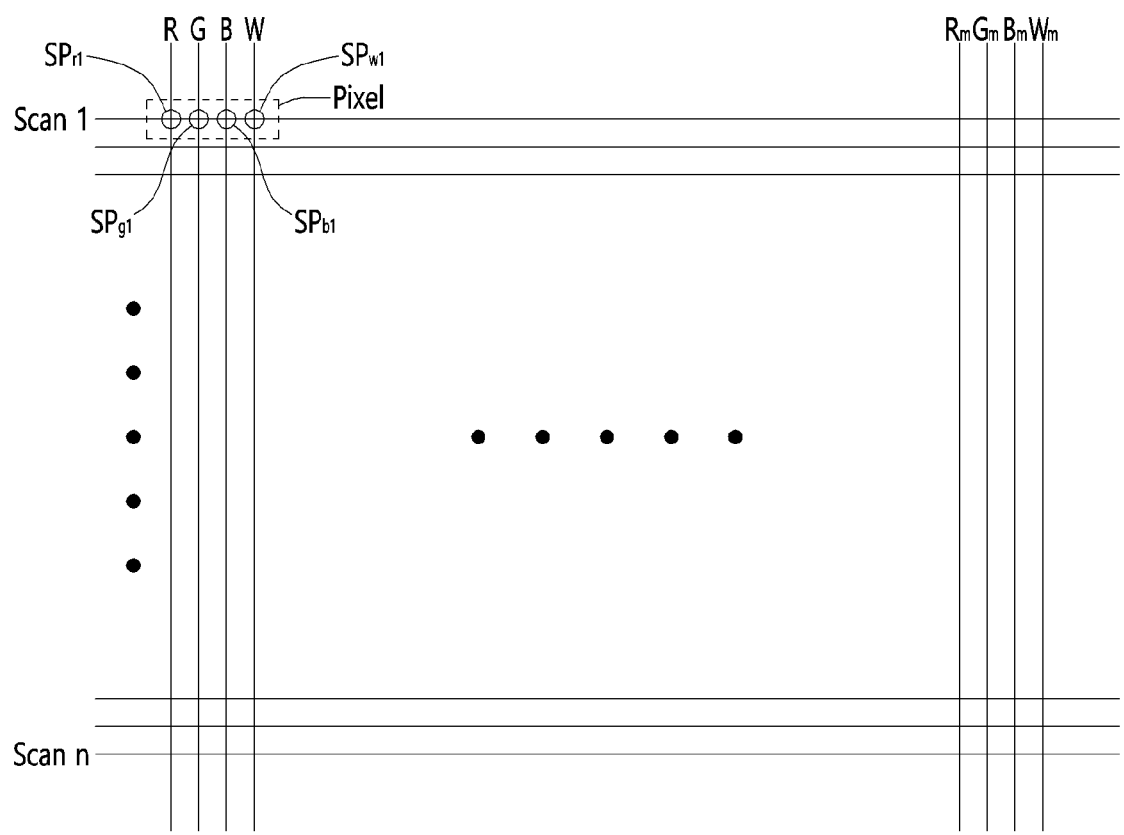
FIG. 3 is a view illustrating a layout structure of the display panel of FIG. 2.
Figure 4:
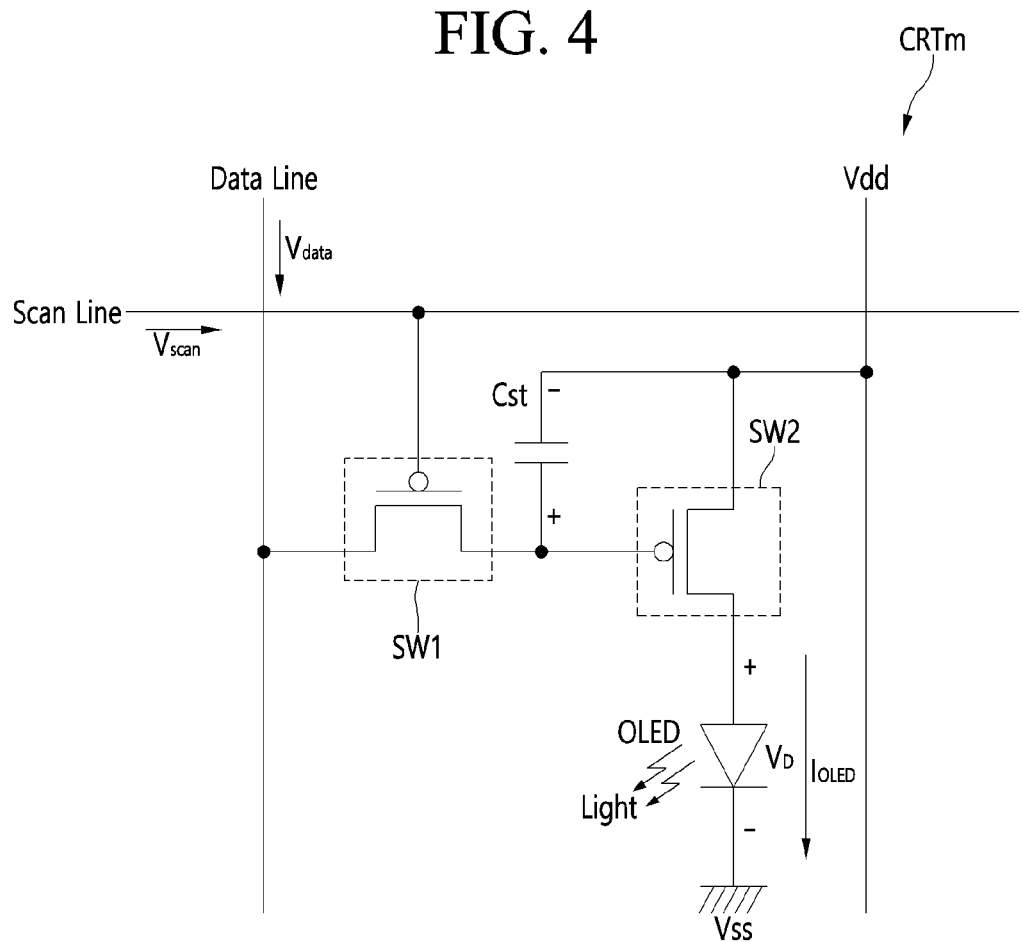
FIG. 4 is a view illustrating a unit pixel circuit in the display panel of FIG. 3.

FIG. 2 is a block diagram illustrating the display module of FIG. 1, FIG. 3 is a view illustrating a layout structure of the display panel of FIG. 2, and FIG. 4 is a view illustrating a unit pixel circuit in the display panel of FIG. 3.

Referring to FIG. 2, the display module 110 may include a timing controller 112, a gate driver 114, a data driver 116 and the display panel 118. The display module 110 may include more components.

The display panel 118 may be a device capable of displaying an image based on driving current. For example, the display panel 118 may be an OLED display panel, but the embodiments are not limited thereto.

The timing controller 112 may control the gate driver 114 and the data driver 116. That is, the timing controller 112 may output a gate control signal for controlling the gate driver 114 and a data control signal for controlling the data driver 116.

The gate driver 114 may supply a gate signal, for example, a scan signal, to the display panel 118 in response to a gate control signal. In the display panel 118, a pixel may be activated according to the scan signal. Activating the pixel may mean that an image signal are supplied to the pixel. As described below, the pixel may include one or more switches. In this case, activating the pixel may mean that the switching element is turned on by the scan signal.

The data driver 116 may supply the image signal to the display panel 118 in units of frames according to a data control signal. The display panel 118 may supply the image signal to the pixel and display an image through the pixel. The image may be displayed through a plurality of pixels included in the display panel 118 in units of every frame.

As shown in FIG. 3, the display panel 118 may include a plurality of pixels defined by intersections of a plurality of gate lines Scan 1 to Scan n and a plurality of data lines R1, G1, B1, W1 to Rm, Gm, Bm, Wm. The plurality of pixels may be arranged in the form of a matrix.

As shown in FIG. 3, each pixel may consist of four subpixels SPr1, SPg1, SPb1 and SPw1 as one unit, but the embodiments are not limited thereto. Each of the subpixels SPr1, SPg1, SPb1 and SPw1 may include an organic light emitting layer capable of implementing different colors.

As shown in FIG. 4, each pixel CRTm may include a scan switching element SW1, a storage capacitor Cst, a driving switching element SW2 and an organic light emitting layer OLED.

A scan line is connected to a gate terminal of the scan switching element SW1. The scanning switching element SW1 is turned on according to a scan signal Vscan input from the gate driver 114. In a case where the scan switching element SW1 is turned on, an image signal Vdata input from the data driver 116 is transferred to the gate terminal of the drive switching element SW2 or one terminal of the storage capacitor Cst.

The storage capacitor Cst is formed between the gate terminal and a source terminal of the drive switching element SW2. A predetermined difference between an image signal level transferred to one terminal of the storage capacitor Cst and a DC (Vdd) level transferred to the other terminal of the storage capacitor Cst is stored in the storage capacitor Cst.

For example, in a case where image signals have different levels according to a pulse amplitude modulation (PAM) scheme, power levels that are stored in the storage capacitor Cst are different according to a difference between levels of image signals Vdata.

As another example, in a case where image signals have different pulse widths according to a pulse width modulation (PWM) scheme, power levels that are stored in the storage capacitor Cst are different according to a difference between pulse widths of image signals Vdata.

The drive switching element SW2 is turned on according to the power level stored in the storage capacitor Cst. In a case where the drive switching element SW2 is turned on, a drive electric current ($I_{OLED}$), which is in proportion to the stored power level, flows through the organic light-emitting layer (OLED). Accordingly, the organic light-emitting layer (OLED) performs a light-emitting operation.

The organic light-emitting layer (OLED) includes a light-emitting layer (EML) for RGBW, which corresponds to a subpixel, and includes at least one of the following layers: a hole implementation layer (HIL), a hole transportation layer (HTL), an electron transportation layer (ETL), and an electron implementation layer (EIL). In addition to these, the organic light-emitting layer includes a hole support layer and so on.

On the other hand, when it comes to a subpixel, the organic light-emitting layer outputs while light, but in the case of the subpixels for green, red, and blue, a separate color filter is provided in order to realize color. On the other hand, in the case of the subpixel for white, white light is output and thus a separate color filter is unnecessary.

On the other hand, in the drawings, as the scan switching element SW1 and the drive switching element SW2, p-type MOSFETs are illustrated, but it is also possible that n-type MOSFETs, or switching elements, such as JETs, IGBTs, or SICs, are used.

Referring to FIG. 2 again, the display panel 118 may include a detector 119.

The detector 119 may detect driving current flowing in the pixel of the display panel 118. For example, the detector 119 may be connected to the data lines R1, G1, B1, W1 to Rm, Gm, Bm, Wm shown in FIG. 3. One or more detectors 119 may be provided. The detector 119 may detect the load state of the display panel 118. The detector 119 may detect the load state by measuring driving current flowing in the data lines R1, G1, B1, W1 to Rm, Gm, Bm, Wm.

Figure 5:
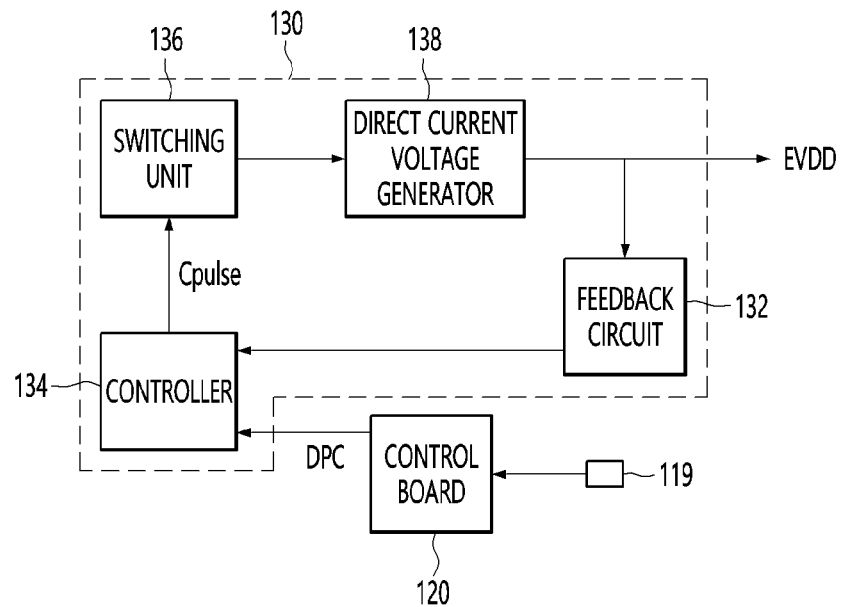
FIG. 5 is a block diagram illustrating a power board of FIG. 1.

FIG. 5 is a block diagram illustrating a power board of FIG. 1.

Referring to FIG. 5, the power board 130 may include a controller 134, a switching circuit 134, a DC voltage generator 138 and a feedback circuit 132.

The controller 134 may control the DC voltage generator 138 to adjust the DC voltage EVDD. The controller 134 may control the switching circuit 136 to adjust the DC voltage EVDD. For example, the controller 134 may output a control signal Cpulse to control the switching circuit 136.

The control signal Cpulse may have a pulse frequency. The control signal Cpulse having the pulse frequency may include a high signal and a low signal periodically.

The period may vary according to the load state of the display panel 118. That is, the width of the high signal may vary and the width of the low signal may vary according to the load state of the display panel 118. In this case, the width of the high signal and the width of the low signal may be the same, but the embodiments are not limited thereto.

Figure 8:
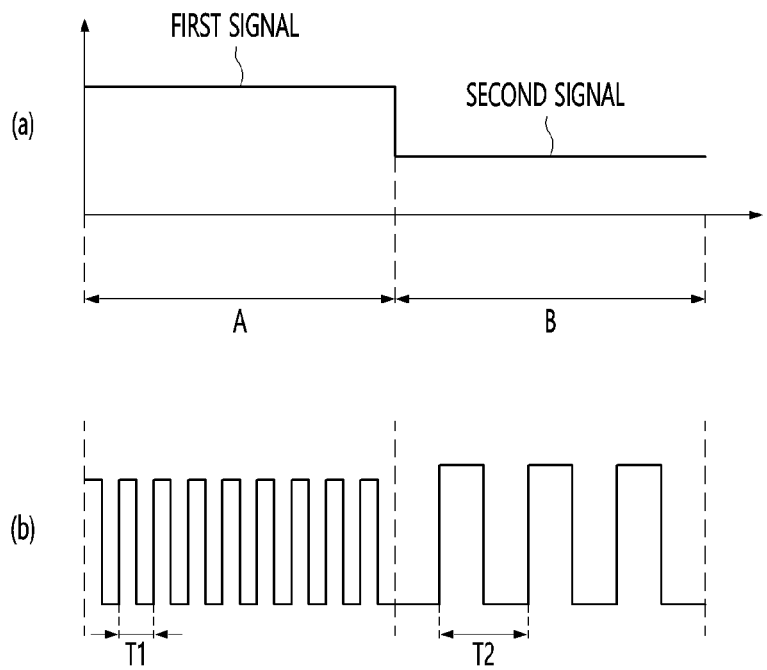
FIG. 8 is a view illustrating a pulse frequency of a control signal according to an output signal in a feedback circuit of FIG. 5.

For example, as shown in FIG. 8(b), the controller 134 may generate the control signal Cpulse with a relatively short pulse frequency at a first period T1 in a section A in which the load of the display panel 118 is small. In this case, the width of the high signal and the width of the low signal may be relatively narrow.

For example, as shown in FIG. 8(b), the controller 134 may generate the control signal Cpulse with a relatively long pulse frequency at a second period T2 in a section B in which the load of the display panel 118 is large. In this case, the width of the high signal and the width of the low signal may be relatively large. The second period T2 may be larger than the first period T1.

The switching circuit 136 may periodically supply a power supply voltage to the DC voltage generator 138 according to the pulse frequency of the control signal Cpulse. The DC voltage generator 138 may generate a DC voltage based on the power supply voltage received periodically. The power supply voltage may be an alternating current voltage or a DC voltage.

Meanwhile, the control signal Cpulse of the pulse frequency may be generated based on a first output signal received from the feedback circuit 132 and a second output signal DPC received from the control board 120. That is, the controller 134 may generate the control signal Cpulse of the pulse frequency based on the first output signal received from the feedback circuit 132 and the second output signal DPC received from the control board 120. For example, when the first output signal or the second output signal DPC is changed, the pulse frequency of the control signal Cpulse may also be changed. That is, when the first output signal or the second output signal DPC is changed, the period of the pulse frequency of the control signal Cpulse may be changed. The first output signal or the second output signal DPC may be changed according to the load state of the display module 110, and thus the period of the pulse frequency of the control signal Cpulse may also be changed.

When the control signal Cpulse of the pulse frequency output from the controller 134 is changed, the DC voltage EVDD generated by switching according to the changed control signal Cpulse of the pulse frequency may also be changed.

In the embodiment, by adjusting the DC voltage EVDD according to the load state of the display panel 118, it is possible to improve power efficiency and to extend lifespan.

The feedback circuit 132 may be connected to, for example, an output terminal of the DC voltage generator 138 to detect a feedback signal from the output terminal of the DC voltage generator 138.

The DC voltage EVDD output from the DC voltage generator 138 may vary according to the load state of the display panel 118. For example, when the load of the display panel 118 is large, since energy consumed in the display panel 118 is large, the DC voltage EVDD may decrease. For example, when the load of the display panel 118 is small, since the energy consumed in the display panel 118 is small or little, the DC voltage EVDD may be maintained without change.

The feedback circuit 132 may output one of a first signal and a second signal based on the feedback signal. The first signal and the second signal may be the above-described first output signal.

For example, the second signal may be smaller than the first signal, but the embodiments are not limited thereto. For example, the first signal may be a signal output when the DC voltage EVDD of the DC voltage generator 138 is not significantly changed in a case where the display panel 118 displays, for example, a black grayscale image and thus energy consumption is small and thus the load of the display panel 118 is small. For example, the second signal may be a signal output when the DC voltage EVDD of the DC voltage generator 138 is significantly changed in a case where the display panel 118 displays, for example, a white grayscale image and thus energy consumption is large and thus the load of the display panel 118 is large.

The feedback circuit 132 may set a threshold for obtaining output of the first signal or the second signal. The feedback circuit 132 may compare, for example, the feedback signal with the threshold and output the first signal or the second signal as the first output signal as a result of comparison. For example, the feedback circuit 132 may output the first signal as the first output signal when the feedback signal is less than the threshold. For example, the feedback circuit 132 may output the second signal as the first output signal when the feedback signal is greater than the threshold.

Meanwhile, the controller 134 may output the second output signal DPC from the control board 120. The second output signal DPC may be a signal level (value). The control board 120 may output a signal level based on the load state of the display panel 118.

The control board 120 may obtain the load state information of the display panel 118 based on a detected signal from the detector 119. For example, when the detected signal is small, it means that the load of the display panel 118 is small, and, when the detected signal is large, it means that the load of the display panel 118 is large.

For example, the controller 134 may generate the control signal Cpulse having a first pulse frequency based on the first output signal received from the feedback circuit 132. For example, the controller 134 may change the control signal Cpulse having the first pulse frequency to the control signal Cpulse having the second pulse frequency based on the second output signal DPC received from the control board 120.

The second pulse frequency may be greater than the first pulse frequency, but the embodiments are not limited thereto. For example, when the first pulse frequency is 150 kHz, the second pulse frequency may be 170 kHz.

As shown in FIG. 8(a), the feedback circuit 132 may output a first signal and a second signal smaller than the first signal as the first output signal. The first signal may be a signal output when the DC voltage EVDD of the DC voltage generator 138 is not significantly changed in a case where the display panel 118 displays, for example, a black grayscale image and thus energy consumption is small and thus the load of the display panel 118 is small. For example, the second signal may be a signal output when the DC voltage EVDD of the DC voltage generator 138 is significantly changed in a case where the display panel 118 displays, for example, a white grayscale image and thus energy consumption is large and thus the load of the display panel 118 is large.

The controller 134 may obtain the control signal Cpulse of the first pulse frequency based on the first output signal.

As shown in FIG. 8(b), when the first signal is received from the feedback circuit 132 as the first output signal, the controller 134 may obtain the control signal Cpulse of the first pulse frequency having a first period T1. When the second signal is received from the feedback circuit 132 as the first output signal, the controller 134 may obtain the control signal Cpulse of the second pulse frequency having a second period T2. The first period T1 may be smaller than the second period T2. The width of the high signal and the width of the low signal are narrow in the control signal Cpulse of the first pulse frequency having the first period T1, and the width of the high signal and the width of the low signal are wide in the control signal Cpulse of the second pulse frequency having the second period T2. That is, the periods T1 and T2 of the control signal Cpulse of the first pulse frequency may vary according to the first signal and the second signal received from the feedback circuit 132.

The DC voltage EVDD obtained by switching the switching circuit 136 may also vary according to the control signal Cpulse of the first pulse frequency having different periods T1 and T2.

The change range of the second pulse frequency may be, for example, 1 to 20 kHz, but the embodiments are not limited thereto. When the change range of the second pulse frequency exceeds 20 kHz, the DC voltage EVDD output from the DC voltage generator 138 is too small and thus driving of the display panel 118 is unstable and defects such as flicker may occur. The change range of the pulse frequency is a difference between the second pulse frequency and the first pulse frequency and may be a weight (a of FIG. 9) preset according to the second output signal DPC.

As shown in FIG. 7, the difference between the second pulse frequency and the first pulse frequency may be changed in inverse proportion to the second output signal DPC.

For example, as the second output signal DPC increases from 0V to a maximum voltage, the difference between the second pulse frequency and the first pulse frequency may linearly decrease. In contrast, as the second output signal DPC decreases the maximum voltage to 0V, the difference between the second pulse frequency and the first pulse frequency may linearly increase. For example, the maximum voltage may be 3V, but the embodiments are not limited thereto.

For example, when the second output signal DPC is a maximum voltage, the pulse frequency of the control signal Cpulse obtained by the controller 134 may be the first pulse frequency generated based on the first output signal output from the feedback circuit 132.

Figure 9:
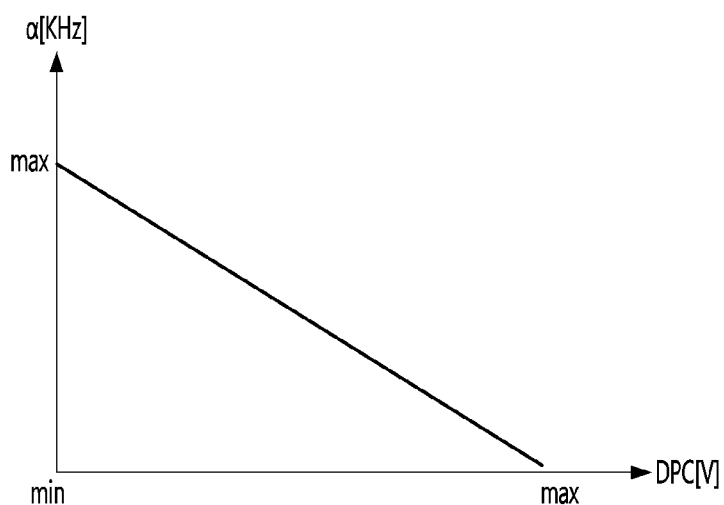
FIG. 9 is a view illustrating a pulse frequency according to an output signal of a control board of FIG. 5.

For example, as shown in FIG. 9, when the second output signal DPC is 0V, the pulse frequency of the control signal Cpulse obtained by the controller 134 may be the second pulse frequency obtained by adding a weight α to the first pulse frequency generated based on the first output signal of the feedback circuit 132. When the second output signal DPC is 0V, the weight a may be a maximum weight. For example, the maximum weight may be 20 kHz, but the embodiments are not limited thereto.

The controller 134 may include a digital integrated circuit.

The controller 134 may store the weight α according to the second output signal DPC. The weight α according to the second output signal DPC may be stored in a look-up table, but the embodiments are not limited thereto.

When the second output signal DPC is received from the control board 120, the controller 134 may obtain the weight α corresponding to the second output signal DPC, and obtain the control signal Cpulse of the second pulse frequency by adding the weight α to the first pulse frequency generated based on the first output signal of the feedback circuit 132.

The control board 120 may output the first output signal based on the load state information of the display panel 118.

Figure 6:
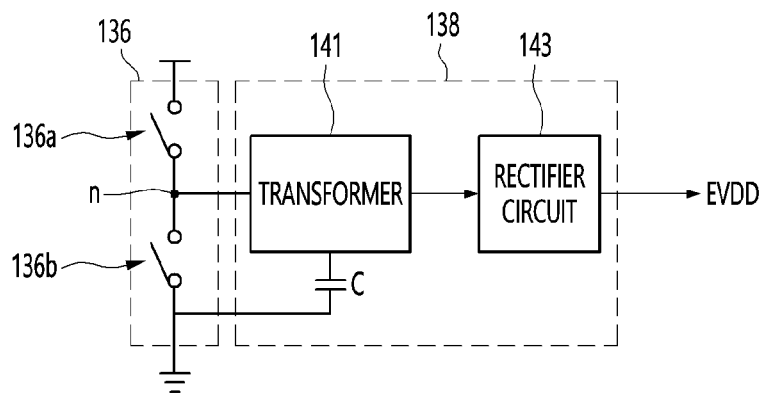
FIG. 6 is a view illustrating a switching circuit and a DC voltage generator of FIG. 5 in detail.

FIG. 6 is a view illustrating a switching circuit and a DC voltage generator of FIG. 5 in detail.

Referring to FIG. 6, the switching circuit 136 may include a first switch 136a and a second switch 136b.

The first switch 136a may be connected between a power supply voltage line and a node n. The second switch 136b may be connected between the node n and the ground. The first switch 136a and the second switch 136b may be, for example, semiconductor transistors. For example, the first switch 136a and the second switch 136b may be semiconductor transistors having opposite polarities. For example, the first switch 136a may be an n-MOS transistor, and the second switch 136b may be a p-MOS transistor, and vice versa.

The first switch 136a and the second switch 136b may be switched according to the control signal Cpulse of the pulse frequency output from the controller 134. For example, in response to the high signal of the control signal Cpulse of the pulse frequency, the first switch 136a may be turned on and the second switch 136b may be turned off. For example, in response to the low signal of the control signal Cpulse of the pulse frequency, the first switch 136a may be turned off and the second switch 136b may be turned on.

Since the control signal Cpulse of the pulse frequency includes periodic high and low signals, the first switch 136a and the second switch 136b may be periodically turned on/off according to the control signal Cpulse of the pulse frequency.

The DC voltage generator 138 may include a transformer 141. One side of the transformer 141 may be connected to the node n of the switching circuit 136, and the other side of the transformer 141 may be connected to the ground. A capacitor C may be connected between the transformer 141 and the ground to maintain the power supply voltage input by switching of the switching circuit 136.

For example, when the first switch 136a of the switching circuit 136 is turned on, a predetermined voltage is induced in the transformer 141 by the power supply voltage, and, when the second switch 136b of the switching circuit 136 is turned on, the voltage may be maintained by the capacitor C. Whenever the first switch 136a of the switching circuit 136 is periodically turned on, a predetermined voltage may be induced in the transformer 141 by the power supply voltage.

The DC voltage generator 138 may further include a rectifier circuit 143. The rectifier circuit 143 may rectify a voltage induced by the transformer 141 to output the DC voltage EVDD.

Figure 10:
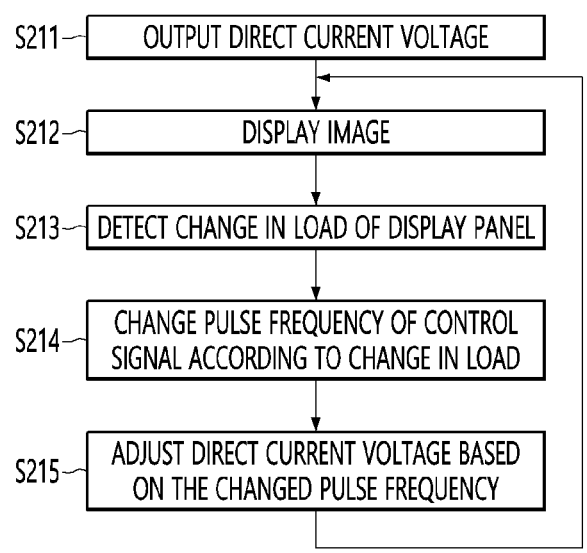
FIG. 10 is a flowchart illustrating a DC voltage supply method of a display device according to an embodiment.

FIG. 10 is a flowchart illustrating a DC voltage supply method of a display device according to an embodiment.

Referring to FIGS. 1, 2, 5, 6 and 10, the power board 130 may output the DC voltage EVDD (S211).

The power board 130 may include the controller 134, the switching circuit 136 and the DC voltage generator 138. By switching the switching circuit 136 according to the control signal Cpulse of the pulse frequency output from the controller 134, the DC voltage generator 138 may rectify the induced voltage from the power supply voltage to output the DC voltage EVDD.

The display module 110 may control the display panel 118 to display an image based on the DC voltage EVDD.

The display module 110 may include the timing controller 112, the gate driver 114, the data driver 116 and the display panel 118.

Although not shown in FIG. 2, the display module 110 may further a power supply. The DC voltage EVDD output from the DC voltage generator 138 may be supplied to the power supply and the power supply may output a plurality of driving voltages. When the driving voltages may be supplied to the timing controller 112, the gate driver 114 and the data driver 116, respectively. The timing controller 112, the gate driver 114 and the data driver 116 may be driven by the driving voltages. For example, the timing controller 112 may output a gate control signal Cpulse for controlling the gate driver 114 and a data control signal Cpulse for controlling the data driver 116 based on the driving voltages. The gate driver 114 may output a scan signal based on the driving voltages. The data driver 116 may output an image signal based on the driving voltages.

The display panel 118 may activate pixels for each line according to the scan signal and supply image data to the activated pixels to display an image (S212).

The control board 120 may detect a change in load of the display panel 118 (S213).

The image is displayed on the display panel 118 in units of frames, and the load of the display panel 118 varies according to the grayscale of the image displayed in units of frames.

The detector 119 installed in the display panel 118 may detect the load state of the display panel 118.

The control board 120 may obtain the load state information of the display panel 118 based on the detected signal output from the detector 119, and output the second output signal DPC based on the obtained load state information.

Although not shown, the feedback circuit 132 may output the first output signal based on the feedback signal detected from the output terminal of the DC voltage generator 138.

The power board 130 may change the pulse frequency of the control signal Cpulse according to the change in load of the display panel 118 (S214).

The controller 134 of the power board 130 may obtain the control signal Cpulse of the first pulse frequency based on the first output signal received from the feedback circuit 132.

The controller 134 may obtain the weight α based on the second output signal DPC received from the control board 120, and obtain the control signal Cpulse of the second pulse frequency. The second pulse frequency may be a value obtained by adding the weight α to the first pulse frequency. Accordingly, the controller 134 may obtain the control signal Cpulse having the second pulse frequency changed from the first pulse frequency, according to the load state of the display panel 118.

The power board 130 may adjust the DC voltage EVDD based on the changed pulse frequency of the control signal Cpulse (S215).

The switching circuit 136 of the power board 130 may be switched according to the changed pulse frequency of the control signal Cpulse, such that the power supply voltage may be periodically or intermittently supplied to the primary side of the transformer 141. The DC voltage generator 138 may induce a predetermined voltage at the secondary side of the transformer 141 by the power supply voltage of the primary side, and rectify the periodically induced voltage to output the DC voltage EVDD. The DC voltage EVDD may be adjusted by switching according to the changed pulse frequency. For example, compared to the DC voltage EVDD before change, the DC voltage EVDD after change may increase or decrease.

Hereinafter, referring to FIG. 11, a method of adjusting a DC voltage according to a change in load will be described.

Figure 11:
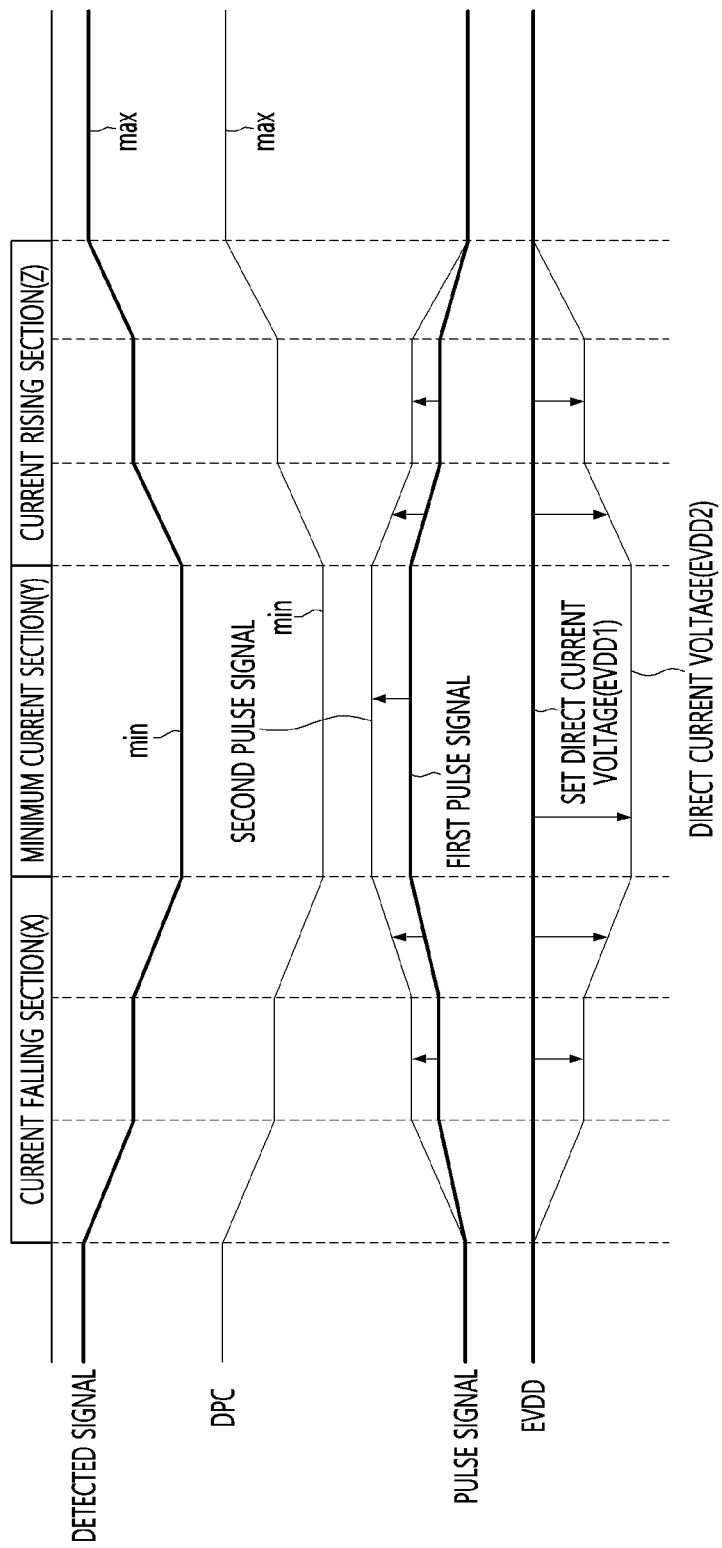
FIG. 11 is a view illustrating a signal waveform according to a change in load.

In FIG. 11, the horizontal axis may represent an elapsed time of display.

Although, in FIG. 11, for convenience of description, a current falling section X, a minimum current section Y and a current rising section Z are uniformly shown, the grayscale of the actually displayed image may be frequently changed in units of frames. Here, current may be driving current, but the embodiments are not limited thereto.

In the current falling section X, for example, the grayscale of the image displayed in units of frames may decrease and the driving current may also decrease to display the image of the decreased grayscale.

In the minimum current section Y, for example, the grayscale of the image displayed in units of frames may be a minimum and may be, for example, a black grayscale. In order to display the black grayscale image, the driving current may also be minimum. For example, the driving current may be 0A or may have a current value close to 0A.

In the current rising section Z, for example, the grayscale of the image displayed in units of frames may increase and the driving current may also increase to display the image of the increased grayscale.

<Operation of Current Falling Section X>

For example, in the current falling section X in which the grayscale of the image decreases, the detected signal detected by the detector 119 may also decrease.

The control board 120 may output a relatively small second output signal DPC based on the detected signal.

For example, referring to FIG. 9, the second output signal DPC may be 2V.

The controller 134 of the power board 130 may change the pulse frequency based on the second output signal DPC of 2V and obtain the control signal Cpulse of a new pulse frequency.

When the control signal Cpulse of the first pulse frequency is obtained based on the first output signal received from the feedback circuit 132, the controller 134 of the power board 130 may generate the control signal Cpulse of the second pulse frequency changed from the first pulse frequency based on the second output signal DPC received from the control board 120.

As shown in FIG. 11, the second pulse frequency obtained by changing the first pulse frequency based on the second output signal DPC received from the control board 120 may be greater than the first pulse frequency of the control signal Cpulse obtained based on the first output signal received from the feedback circuit 132. This is because the weight α corresponding to the second output signal is added to the first pulse frequency.

Therefore, as the load of the display panel 118 decreases, the second output signal DPC further increases. Therefore, the weight α corresponding to the second output signal DPC increases and, as a result, the second pulse frequency of the control signal Cpulse further increases.

As the second pulse frequency of the control signal Cpulse increases, switching of the switching circuit 136 is more frequently performed and the DC voltage EVDD2 output from the DC voltage generator 138 decreases.

In the current falling section X, as the grayscale of the image gradually decreases, the detected signal and the second output signal DPC also gradually decrease. In contrast, the second pulse frequency of the control signal Cpulse may gradually increase in inverse proportion to the second output signal DPC. The DC voltage EVDD2 is inversely proportional to the second output signal DPC and thus gradually decrease. That is, the DC voltage EVDD2 may gradually decreases compared to the set DC voltage EVDD1. The set DC voltage EVDD1 may be a maximum DC voltage, but the present embodiments are not limited thereto. The set DC voltage EVDD1 may be a voltage for stably displaying the white grayscale image.

<Operation of Minimum Current Section Y>

When current is minimum, since the load is also minimum, the second output signal DPC is also a minimum value, for example, 0V, and the weight α is a maximum value in inverse proportion thereto. Therefore, the second pulse frequency of the control signal Cpulse may have a maximum value.

Accordingly, in the minimum current section Y, the magnitude of the DC voltage EVDD2 may be minimized.

For example, when the maximum value of the DC voltage is 24V, in the minimum current section Y, EVDD2 may be smaller than 24V. The minimum DC voltage EVDD2 is at least a voltage capable of stably displaying an image on the display panel 118, may be, for example, 20V, which may vary depending on the specification of the display panel 118.

<Operation of Current Rising Section Z>

In the current rising section Z, as the grayscale of the image gradually increases, since the load increases, the detected signal and the second output signal DPC also gradually increases. In contrast, the second pulse frequency of the control signal Cpulse may gradually decrease in inverse proportion to the second output signal DPC. The DC voltage EVDD2 may gradually increase in inverse proportion to the second pulse frequency. That is, the DC voltage EVDD2 may gradually increase toward the set DC voltage EVDD1. If current maximally increases, a maximum current value may be a value for displaying a white grayscale image. In case of maximum current, the DC voltage EVDD2 may be the set DC voltage, that is, the maximum DC voltage EVDD1.

As shown in FIG. 11, the DC voltage obtained by the control signal Cpulse of the first pulse frequency may be constantly maintained at the DC voltage EVDD1 set in all the current falling section X, the minimum current section Y and the current rising section Z.

In contrast, the DC voltage EVDD2 obtained by the control signal Cpulse of the second frequency changed from the first pulse frequency may be smaller than the set DC voltage EVDD1 set in all the current falling section X, the minimum current section Y and the current rising section Z.

Accordingly, in the embodiment, the DC voltage EVDD2 is lower than the set DC voltage EVDD1 in a section in which current is low according to the change in the load, thereby decreasing stress applied to related elements to extend lifespan and improving power efficiency to reduce energy waste.

INDUSTRIAL APPLICABILITY

Embodiments are applicable to the display field.

The invention claimed is:

1. A display device comprising:
a display including a display panel;
a control board configured to control the display; and
a power board configured to output a direct current (DC) voltage to the display,
wherein the power board is further configured to change a first pulse frequency of a control signal into a second pulse frequency obtained by adding a weight to the first pulse frequency, in order to output an adjusted DC voltage according to a change in a load of the display panel, wherein the weight is changed inversely and linearly according to an output signal level that changes according to the change in the load.

2. The display device of claim 1,
wherein the display panel is configured to display an image based on a driving current, and
wherein the display further includes:
a detector configured to detect a change in the load corresponding to a change in the driving current.

3. The display device of claim 2, wherein the control board is further configured to perform control to change an output signal according to the detected change in the load.

4. The display device of claim 3, wherein the power board comprises:
a controller configured to obtain a control signal having a changed pulse frequency in correspondence with the changed output signal;
a DC voltage generator configured to output the DC voltage; and
a switching circuit configured to be switched according to the changed pulse frequency in order to adjust the output DC voltage.

5. The display device of claim 4, wherein the power board further comprises a feedback circuit configured to output a second output signal based on a feedback signal from an output terminal of the DC voltage generator.

6. The display device of claim 5,
wherein the second output signal comprises either a first signal or a second signal smaller than the first signal,
wherein the first signal is output when the load of the display panel is small, and
wherein the second signal is output when the load of the display panel is large.

7. The display device of claim 6, wherein the controller is further configured to:
obtain the first pulse frequency set in correspondence with one of the first signal or the second signal; and
obtain a control signal having the second pulse frequency changed from the first pulse frequency based on the changed output signal.

8. The display device of claim 7, wherein the DC voltage is adjusted in inverse proportion to the second pulse frequency.

9. The display device of claim 4, wherein the controller is a digital integrated circuit.

10. The display device of claim 2, wherein a luminance of the display panel varies according to the change in the driving current.

11. The display device of claim 10, wherein the power board is further configured to perform control such that the DC voltage varies according to a change in the luminance.

12. The display device of claim 1, wherein the weight is in a range from 1 to 20 kHz.

13. The display device of claim 1, wherein adjustment of the DC voltage is in a range from 1 to 4V.

14. A direct current (DC) voltage supply method of a display device, the DC voltage supply method comprising:
detecting a change in a load of a display panel of a display of the display device;
changing a first pulse frequency of a control signal into a second pulse frequency obtained by adding a weight to the first pulse frequency, according to the detected change in the load, wherein the weight is changed inversely and linearly according to an output signal level that changes according to the change in the load;
adjusting a DC voltage based on the changed first pulse frequency; and
outputting the adjusted DC voltage to the display.

15. The DC voltage supply method of claim 14,
wherein the display panel is configured to display an image based on a driving current, and
wherein detecting the change in the load of the display panel comprises:
detecting the change in the load corresponding to a change in the driving current; and
performing control to change an output signal according to the detected change in the load.

16. The DC voltage supply method of claim 15, wherein changing the pulse frequency of the control signal comprises:
outputting, by a DC voltage generator, the DC voltage;
obtaining a control signal having a pulse frequency changed in correspondence with the changed output signal; and
adjusting the output DC voltage by switching according to the changed pulse frequency of the control signal.

17. The DC voltage supply method of claim 16, further comprising outputting a second output signal based on a feedback signal from an output terminal of the DC voltage generator.

18. The DC voltage supply method of claim 17, further comprising:
obtaining the first pulse frequency set in correspondence with one of a first signal or a second signal included in the second output signal, the second signal being smaller than the first signal; and
obtaining a control signal having the second pulse frequency changed from the first pulse frequency based on the changed output signal.

* * * * *